(12) United States Patent
Kuepper

(10) Patent No.: US 7,363,833 B2
(45) Date of Patent: Apr. 29, 2008

(54) METHOD FOR REFERENCING A CONTROL DEVICE OF A SHIFT ACTUATOR OF AN AUTOMATIC TRANSMISSION AND A CONTROL DEVICE

(75) Inventor: Klaus Kuepper, Buehl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 248 days.

(21) Appl. No.: 11/351,357

(22) Filed: Feb. 10, 2006

(65) Prior Publication Data

US 2006/0207363 A1    Sep. 21, 2006

(30) Foreign Application Priority Data

Mar. 16, 2005    (DE) ............... 10 2005 012 035

(51) Int. Cl.
*F16H 61/00*    (2006.01)
(52) U.S. Cl. ....................................... 74/335
(58) Field of Classification Search ............... 74/335; 192/3–63
See application file for complete search history.

(56) References Cited

U.S. PATENT DOCUMENTS

2006/0009328 A1*    1/2006    Jung et al. ................. 477/176

FOREIGN PATENT DOCUMENTS

DE    10344106    4/2004

* cited by examiner

*Primary Examiner*—Dirk Wright
(74) *Attorney, Agent, or Firm*—Simpson & Simpson, PLLC

(57) ABSTRACT

In a method for referencing a control device, containing an incremental sensor, of a shift actuator of an automatic transmission, a clutch that is controlled by a clutch actuator and causes a transmission of torque between the drive motor and at least one vehicle wheel in a drive train containing the transmission of a motor vehicle is adjusted so that it transfers a lower torque when a shift actuator of the control device is operated in the direction of engaging a gear for the purpose of referencing the transmission.

6 Claims, 1 Drawing Sheet

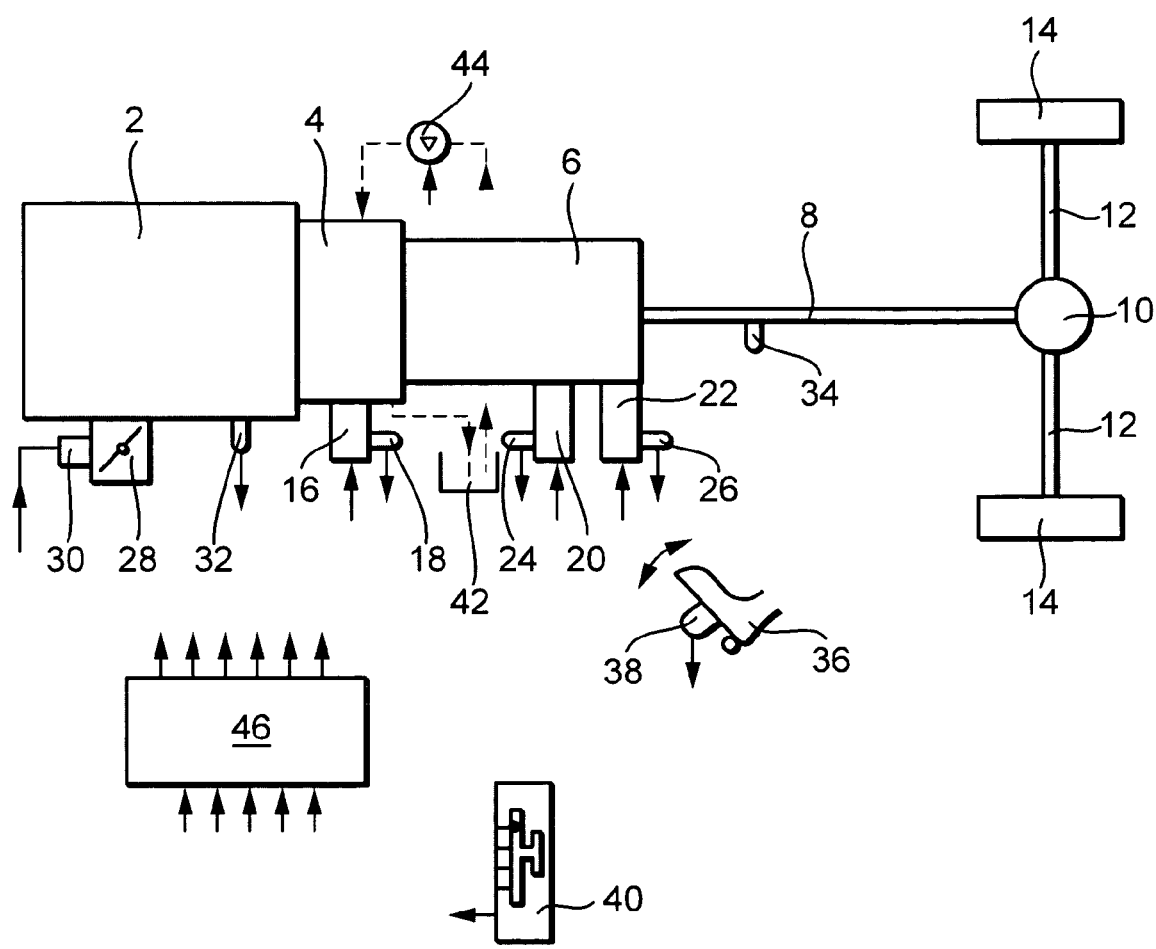

METHOD FOR REFERENCING A CONTROL DEVICE OF A SHIFT ACTUATOR OF AN AUTOMATIC TRANSMISSION AND A CONTROL DEVICE

CROSS REFERENCE TO RELATED APPLICATIONS

This patent application claims priority of German Patent Application No. 10 2005 012 035.0, filed on Mar. 16, 2005, which application is incorporated herein by reference.

FIELD OF THE INVENTION

The invention relates to a method for referencing a control device, containing an incremental sensor, of a shift actuator of an automatic transmission. The invention also relates to a control device for a series arrangement consisting of a clutch and an automatic transmission contained in a drive train of a motor vehicle.

BACKGROUND OF THE INVENTION

An automatic transmission is generally controlled by a selector and a shift actuator, whereby shift gates are preselected by the selector, within which gears are engaged or released by the shift actuator. For a fast and precise shifting, it is especially necessary to know the exact position of the shift actuator and/or of a shift element controlled by it. The position of the shift actuator and/or of a shift element operated by it is generally sensed by means of an incremental sensor, which e.g. counts a rotation converted into a linear motion in the form of angular increments and increases or decreases its counter status by 1 with each angular increment, depending on the direction of rotation. In order to make a decision about the absolute position from the counter status, the knowledge of a reference position is necessary, starting from which the absolute position can be determined when the change in the counter status is known.

For example, if the reference position and/or the counter status corresponding to the reference position is lost after a reset or as a result of a system error, referencing must be performed again, in that the shift element is moved, by means of the actuator, to one or more reference positions that are recognized and have the counter status stored for them. If at first no position information is available, during a sensing in shifting direction and/or movement of the shift element in the direction of engaging a gear, it may happen that sensing takes place opposing a synchronization of the respective gear. If this sensing leads to engagement of a gear that is not appropriate for the vehicle speed, e.g., engagement of first gear at a driving speed of 100 km/h, serious transmission damage can occur.

BRIEF SUMMARY OF THE INVENTION

The invention is based on the object of improving the safety of a transmission against being damaged as a result of engaging a non-permissible gear during referencing.

A solution to this problem is achieved with a method for referencing a control device, containing an incremental sensor, of an automated transmission, in which a clutch that is controlled by a clutch actuator and causes a transmission of torque between the drive motor and at least one vehicle wheel and is located in a drive train containing the transmission of a motor vehicle is adjusted so that it transfers a lower torque when a shift actuator of the control device is operated in the direction of engaging a gear for the purpose of referencing the transmission. In this case, the clutch actuator can also be made up of a hydraulic circuit, e.g., of a piston stressed with pressure, whereby the pressure is controlled by means of a pressure or volume control valve, such as a proportioning valve.

With the method according to the invention, it is possible to achieve a case in which the input shaft of the transmission, which is connected with a clutch in such a way as to transfer a low torque, runs at a permissible rotation speed determined by the engine speed that is stabilized during a synchronizing that occurs initially and/or briefly, so that damage as a result of a non-permissible rotation speed of the input shaft is prevented.

Advantageously, the torque transferred by the clutch is adjusted to a lower value with decreasing vehicle speed.

An embodiment of the method according to the invention is preferred in which the low torque is adjusted by means of the clutch actuator for control of the clutch.

Alternatively and/or additionally, the low torque can be adjusted by control of the volume flow of a fluid of an eddy current coupling or the like that flows between the clutch disks.

A control device for a series arrangement consisting of a clutch and an automatic transmission, which is contained in a drive train of a motor vehicle, with which the object of the invention is achieved, contains a clutch actuator for operating the clutch, a shift actuator for engaging and disengaging gears of the transmission by movement of a shift element, an incremental sensor for sensing the movement of the shift element, means for referencing the counter status of the incremental sensor and an electronic control device for controlling the operation of the clutch actuator and the shift actuator according to a predetermined program, this electronic control device controlling the clutch actuator according to one of the methods named above during referencing.

A further development of the control device according to the invention contains a device that can be triggered by the electronic control device, for controlling a cooling fluid flowing through the clutch in such a way that the low torque is adjusted by controlling the volume flow of the cooling fluid flowing through the two clutch disks.

The invention is suitable for use in all types of drive trains, in which the referencing of a transmission actuator with no knowledge of the respective gear can lead to non-permissible rotation speeds or other dangerous stresses that can be prevented in that a clutch contained in the drive train is adjusted for transmission of a low torque. In double clutch transmissions and/or parallel transmissions, the respective clutch that is assigned to the respective transmission unit in which a gear is engaged is the one that is adjusted to transfer a low torque.

BRIEF DESCRIPTION OF THE DRAWINGS

In the following, the invention will be described by way of example and with further details, using a figure that represents a schematic diagram of a vehicle drive train.

DETAILED DESCRIPTION OF THE INVENTION

A According to the single figure, a combustion engine 2 is connected by way of a clutch 4 to a transmission 6, the output shaft of which is connected to a cardamon shaft 8, so that they rotate together, which by way of a differential 10 drives drive shafts 12 that are connected to driven wheels 14 so that they rotate together.

For example, the clutch 4 can be a fluid-cooled friction clutch with clutch disks that can be brought into in mutual friction contact by means of a clutch actuator 16 so that a transmission of torque occurs between the combustion engine 2 and the input shaft of the transmission 6. The position of the clutch actuator 16, and/or of a clutch lever activated by it, is advantageously sensed by a position sensor 18, since the clutch torque that can be transferred, which depends on the position of the clutch lever and possibly on the wear status of the clutch, must be controlled precisely for a proper drive-away from standstill and precise shifting.

The transmission 6 involves, for example, a transmission in which a rotary intervention between an input shaft and an output shaft is caused by the shifting of different gear sets. In a known way, the transmission has a selector 20 and a shift actuator 22, whereby the selector 20 move a selection element into different shift gates so that gears assigned to these shift gates can be shifted with one shift element 22.

Since both the selection process and the shifting process have to be controlled precisely, the position of the selector and/or the selection element is sensed by a position sensor 24 and that of the shift actuator and/or the shift element by a position sensor 26.

To control its power, the combustion engine 2 has a power output stage 28 that is actuated by an actuator 30.

The rotation speed of the combustion engine 2 is sensed by a speed sensor 32. The rotation speed of the cardamon shaft 8 and/or the transmission output shaft is recorded by a speed sensor 34.

The position of an accelerator pedal 36 is sensed by a position sensor 38. Different gears and/or driving programs can be selected with a selector unit 40.

For fluid cooling of the clutch 4, a coolant circuit is provided that pumps coolant, for example transmission fluid, out of a sump 42, by means of a pump 44, and through the clutch.

To control the entire drive train, an electronic control device 46 is provided with at least one microprocessor, data and program memory, the inputs of which are connected to sensors and/or sensing elements of the drive train and the outputs of which are connected to the actuators. It is understood that other or different sensors than those described can be provided and also other or different actuators can be provided.

The structure and function of the drive train described are known and therefore will not be explained in more detail.

The position sensor 26 of the shift actuator 22, like the other position sensors, is generally an incremental angle sensor that senses the rotation of a rotary component driven by an electric motor and contained in a shift actuator and when the rotary component rotates by one angular element, supplies a signal to the control device 46, which increases or decreases the count of a counter status depending on the direction of rotation. Starting from one or more reference positions of the shift element operated by the shift actuator 22, the absolute position of the shift element is known as a result of the relationship given by the transfer kinematics between the angle of rotation and the position of the shift element. If the system crashes or is reset, the reference position or positions can be lost so they have to be determined again for precise functionality of the system. An important reference position is that position, in which a synchronizing occurs between a specific gear wheel and, e.g., the rotation speed of the associated shaft by movement of the shift element. Reaching this synchronizing point is perceptible due to an increased resistance that opposes a further movement of the shift element in the shifting direction, which becomes noticeable, for example, in a speed drop of the rotation speed sensed by incremental sensor 26 or in an elevated power draw of shift actuator 22. These changes are sensed by the electronic control device 46 and assigned to the respective counter status so that the synchronizing point is referenced.

A problem now exists in that when the new referencing that is necessary is carried out, the gear that is engaged during an actuation of a respective shift element in the direction of engaging a gear may be unknown. For example, if the vehicle is driving at a speed of 100 km/h and clutch 4 is completely open, the shift actuator 22 moves a shift element in such a way that the first forward gear is engaged, which would lead to a non-permissible high rotation speed of the transmission input shaft so the transmission would be damaged.

In order to prevent the rotation speed of the transmission input shaft from increasing too quickly to a non-permissible high rotation speed during synchronizing, clutch 4 is to be operated in such a way during a referencing that no complete separation is present between crankshaft and transmission input shaft, rather the clutch transfers a low torque (in the present case drag torque) of, e.g., less than 10 Nm. This ensures that during a brief approach of the synchronizing, the transmission input shaft that is turning at the engine speed does not change its rotation in a way that is non-permissible, since it is "lightly" coupled to the speed of the combustion engine.

Advantageously, the torque that is transferred and/or can be transferred by the clutch is adjusted so it is dependent on the vehicle speed. In particular, if the vehicle is standing or only driving very slowly or the driver does not operate the brakes when the vehicle is standing or driving very slowly, the torque that can be transferred should be selected so it is very low, for example under 5 Nm.

The adjustment of the clutch 4 to a low torque transfer that is advantageous during a referencing does not necessarily have to be carried out by means of the clutch actuator 16, but can additionally, or exclusively, occur in that the cooling fluid stream through clutch 4 is adjusted to a high throughput, in that, e.g., the power of pump 44 is changed or with a clutch that has a cooling fluid flow that is maintained only by the rotation speed of the clutch and the radial flow of the cooling fluid caused by it, the cross section of a flow opening is changed. The torque transfer that occurs between the friction and clutch disks that is cause by the viscosity of the cooling fluid flowing between the clutch disks depends on the cooling fluid throughput.

REFERENCE NUMBER LIST

2 Combustion engine
4 Clutch
6 Transmission
8 Cardamon shaft
10 Differential
12 Drive shaft
14 Wheel
16 Clutch actuator
18 Position sensor
20 Selector
22 Shift actuator
24 Position sensor
26 Position sensor 28 Power output stage
30 Actuator
32 Speed sensor
34 Speed sensor
36 Accelerator pedal
38 Position sensor
40 Selection unit
42 Sump
44 Pump
46 Control device

What is claimed is:

1. A method for referencing a control device (20, 22), containing an incremental sensor (26), of an automatic transmission (6), in which a clutch (4) that is controlled by a clutch actuator (16) and causes a transmission of torque between the drive motor (2) and at least one vehicle wheel (14) and is located in a drive train (2, 4, 6) containing the transmission of a motor vehicle is adjusted so that it transfers a lower torque when a shift actuator (22) of the control device (20, 22) is operated in the direction of engaging a gear for the purpose of referencing the transmission (6).

2. The method according to claim 1, whereby the torque transferred by the clutch (4) is adjusted to a lower value with decreasing vehicle speed.

3. The method according to claim 1, whereby the low torque is adjusted by means of the clutch actuator (16) for operating the clutch (4).

4. The method according to claim 1, whereby the low torque is adjusted by control of the volume flow of the cooling fluid that flows between the clutch disks.

5. A control device for a series arrangement consisting of a clutch (4) and an automatic transmission (6) contained in a drive train of a motor vehicle comprising:

a clutch actuator (16) for operating the clutch (4);

a shift actuator (22) for engaging and disengaging gears of the transmission (6) by movement of a shift element;

an incremental sensor (26) for sensing the movement of the shift element;

means for referencing the counter status of the incremental sensor and an electronic control device (46) for controlling the operation of the clutch actuator and the shift actuator according to a predetermined program, this electronic control device controlling the clutch actuator according to a method for referencing a control device (20, 22), containing said incremental sensor (26), of said automatic transmission (6), in which said clutch (4) that is controlled by said clutch actuator (16) and causes a transmission of torque between a drive motor (2) and at least one vehicle wheel (14) and is located in a drive train (2, 4, 6) containing the transmission of a motor vehicle is adjusted so that it transfers a lower torque when said shift actuator (22) of the control device (20, 22) is operated in the direction of engaging a gear for the purpose of referencing the transmission (6).

6. The control device according to claim 5, containing a device (44) that can be triggered by the electronic control device (46) for controlling a cooling fluid stream flowing through the clutch (4), whereby the electronic control device controls the device for controlling the coolant fluid flowing through the clutch.

* * * * *

UNITED STATES PATENT AND TRADEMARK OFFICE
CERTIFICATE OF CORRECTION

PATENT NO. : 7,363,833 B2  Page 1 of 1
APPLICATION NO. : 11/351357
DATED : April 29, 2008
INVENTOR(S) : Klaus Kuepper It is certified that error appears in the above-identified patent and that said Letters Patent is hereby corrected as shown below:

Column 2
Line 65, delete "A" and insert -- "A" --;
Line 67, delete "cardamon" and insert -- cardan --.

Column 3
Lines 18-21, should read:
-- In a known way, the transmission has a selector 20 and a shift actuator 22, whereby the selector 20 moves a selection element into different shift gates so that gears assigned to these shift gates can be shifted with one shift element 22 --;
Lines 30-32, should read:
-- The rotation speed of the cardan shaft 8 and/or the transmission output shaft is recorded by a speed sensor 34 --.

Column 4
Lines 48-51, should read:
-- The torque transfer that occurs between the friction and clutch disks that is caused by the viscosity of the cooling fluid flowing between the clutch disks depends on the cooling fluid throughput --;
Line 58, should read:
-- 8 Cardan shaft --.

Signed and Sealed this

Thirtieth Day of September, 2008

JON W. DUDAS
*Director of the United States Patent and Trademark Office*